United States Patent [19]

Albertazzi

[11] 4,344,233
[45] Aug. 17, 1982

[54] APPARATUS FOR CHECKING DIAMETRAL DIMENSIONS

[75] Inventor: Gastone Albertazzi, Bologna, Italy

[73] Assignee: Finike Italiana Marposs S.p.A., S. Marino di Bentivoglio, Italy

[21] Appl. No.: 186,891

[22] Filed: Sep. 15, 1980

[30] Foreign Application Priority Data

Sep. 14, 1979 [IT] Italy .................................. 3490 A/79

[51] Int. Cl.³ .............................................. G01B 7/12
[52] U.S. Cl. ................................ 33/178 E; 33/143 L; 33/147 K
[58] Field of Search ............ 33/143 L, 147 K, 147 N, 33/174 L, 178 E

[56] References Cited

U.S. PATENT DOCUMENTS

| 2,419,461 | 4/1947 | Neff | 33/143 L |
| 3,808,696 | 5/1974 | Possati | 33/178 E |
| 3,840,994 | 10/1974 | Izumi et al. | 33/174 L |
| 4,080,741 | 3/1978 | Siddall et al. | 33/178 E |
| 4,279,079 | 7/1981 | Gamberini et al. | 33/178 E |

FOREIGN PATENT DOCUMENTS

| 1144935 | 3/1963 | Fed. Rep. of Germany .... 33/174 L |
| 1298722 | 7/1969 | Fed. Rep. of Germany .... 33/174 L |
| 3532A/76 | 9/1976 | Italy . |
| 822710 | 10/1959 | United Kingdom . |
| 1308553 | 2/1973 | United Kingdom . |
| 1322844 | 7/1973 | United Kingdom . |
| 1447415 | 8/1976 | United Kingdom . |
| 314062 | 9/1971 | U.S.S.R. ............................ 33/178 E |

Primary Examiner—Richard R. Stearns
Attorney, Agent, or Firm—Stevens, Davis, Miller & Mosher

[57] ABSTRACT

An apparatus including two gauging heads, each having a feeler adapted to cooperate with a cylindrical surface of a part to be checked, and control devices for moving the feelers into contact with the cylindrical surface and for obtaining a scanning motion of the feelers as a relative displacement of the measurement axis passing through the feelers with respect to the geometrical axis of the cylindrical surface.

The apparatus is particularly adapted for controlling small diameters, in a static as well as in a dynamic condition.

10 Claims, 9 Drawing Figures

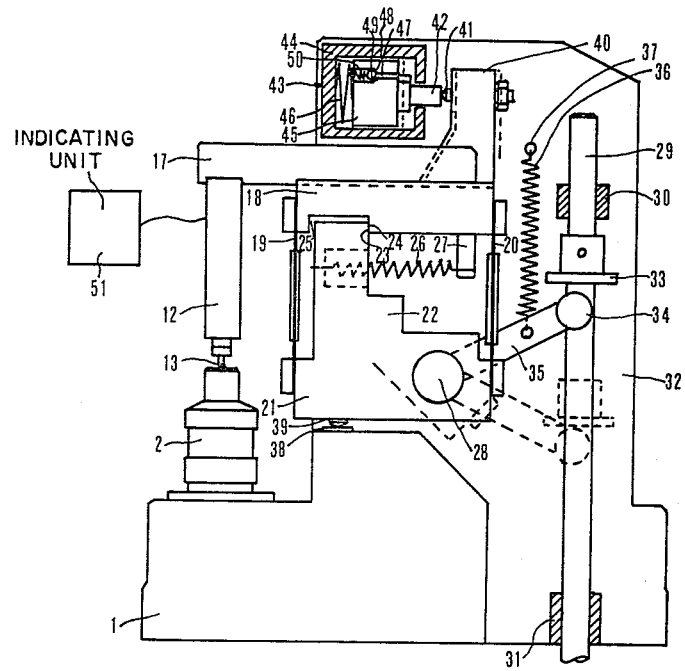
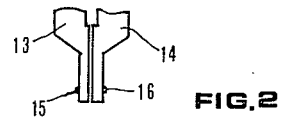
FIG.2
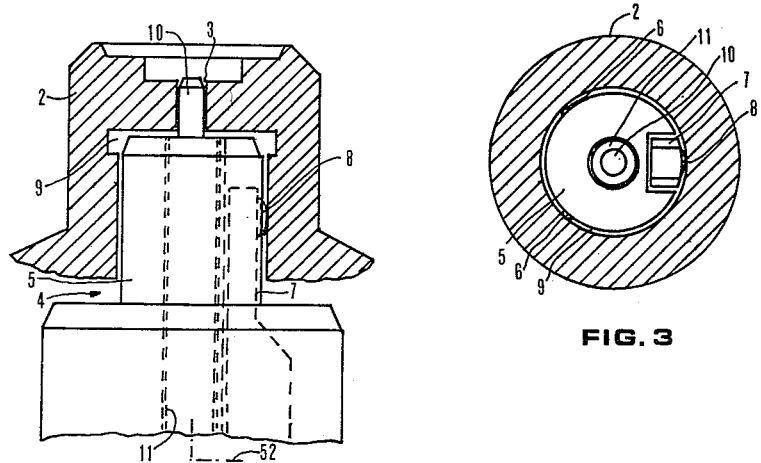
FIG.1
FIG.3

APPARATUS FOR CHECKING DIAMETRAL DIMENSIONS

The present invention relates to an apparatus for checking diametral dimensions of a cylindrical surface of a mechanical part, with measuring means including two probes adapted to cooperate, along a measurement axis, with two points of the cylindrical surface, the measuring means providing measurement signals; processing circuits connected with the measuring means; support and positioning means for supporting and positioning the part to be checked and the measuring means; and control means connected to the support and positioning means for displacing the probes into cooperation with the cylindrical surface and for obtaining a relative motion between the probes and the cylindrical surface.

There are substantially two types of known apparatuses generally used for checking the diameter of cylindrical holes: manual plug gauges and plug gauges for automatic checkings.

The known manual plug gauges comprise a handle which supports a centering and protective nose-piece, wherein there are housed moving arms of one or more electronic gauging heads. Feelers for contacting the hole surface are fixed to the moving arms by connecting elements passing through holes of the nose-piece. The gauging heads provide measurement signals responsive to the position of the feelers.

The nose-piece, which consists of a body substantially cylindrical, with a diameter slightly smaller than the diameter of the hole to be checked, performs the double function of protecting the gauging heads, and particularly the moving arms and the feelers (which may enter into the nose-piece through its holes), and of centering the plug gauge axis with respect to that of the part hole, in order that the pair or pairs of feelers be arranged along diametral directions.

As far as plug gauges for automatic checkings are concerned, for example in connection with machines for checking linear dimensions or with checking stations of transfer machines, the gauge is supported by a slide having precision guides, which introduces a nose-piece, acting as a mechanical protection only, into the hole to be checked. The obtainment, during the measurement, of the concentricity between the gauge axis and the hole axis depends upon an accurate positioning of the part and upon the slide with precision guides.

Evidently, the concentricity between the plug axis and the hole axis may be obtained, for the known gauges, with a certain inaccuracy, for example of some microns.

This means that, as a matter of fact, when the concentricity between the axes is affected by errors, the feelers are arranged along a chord and not along a diameter. Consequently the result of the measurement is affected by a chordal error, which is also present when the checking is of dynamic type, i.e. when there is a relative rotation between the gauge and the part.

If the hole to be checked has a very small diameter and the tolerance range is narrow, the chordal error may be unacceptable. This happens, for example, when the hole to be checked has a nominal diameter of about 1 mm, with a tolerance of 1$\mu$.

Similar drawbacks may occurr when checking external diameters because, evidently, the chordal error may reach unacceptable values in these applications, too.

However, when checking external diameters it is possible to use knife-shaped feelers, or round feelers having a bending radius, which reduce or eliminate the chordal errors. On the other hand, the use of knife shaped feelers also presents some drawbacks and difficulties, because, for example, it is difficult to obtain a perfect parallelism of the contacting edges of the feelers.

An object of the present invention is to provide an apparatus capable of checking external or inner diameters, possibly very small, without chordal errors.

Another object of the invention is to provide an apparatus for both static checkings, i.e. checking of the value of a single diameter, and dynamic checkings, i.e. checking of the values of a plurality of diameters of a cross-section of the part.

A further object is to provide an apparatus which solves the above mentioned problems and which, in addition, is simple and of limited cost and which can be made mostly of assemblable standard elements in order that it may be rendered fit, through simple changes, to carry out checkings on different parts.

According to the present invention, the control means of the apparatus referred to at the beginning of the disclosure are adapted to control the relative motion as a scanning motion with a displacement of the position of the measurement axis, with respect to the cylindrical surface's geometrical axis, having a component perpendicular to the measurement axis, for arranging the measurement axis and the geometrical axis both in coplanar and in non-coplanar positions, the processing circuits being adapted to process the measurement signals obtained during the scanning motion for detecting the diametral dimension of the cylindrical surface.

The invention will be described in detail with reference to the annexed drawings, given for exemplary and non-limiting purposes, wherein equal or equivalent parts are marked by the same reference numerals.

FIG. 1 is a diagrammatic, partly in section, side view of a bench for checking the value of the diameter of a bore, in particular a bore having a small diameter, according to the preferred embodiment of the invention for this type of application;

FIG. 2 shows, with an enlarged scale, a partial vertical section of a device for providing a mechanical reference to the part, this device appertaining to the bench of FIG. 1;

FIG. 3 shows, with the same scale of FIG. 2, a partial horizontal section of the device of FIG. 2;

Figure 4:
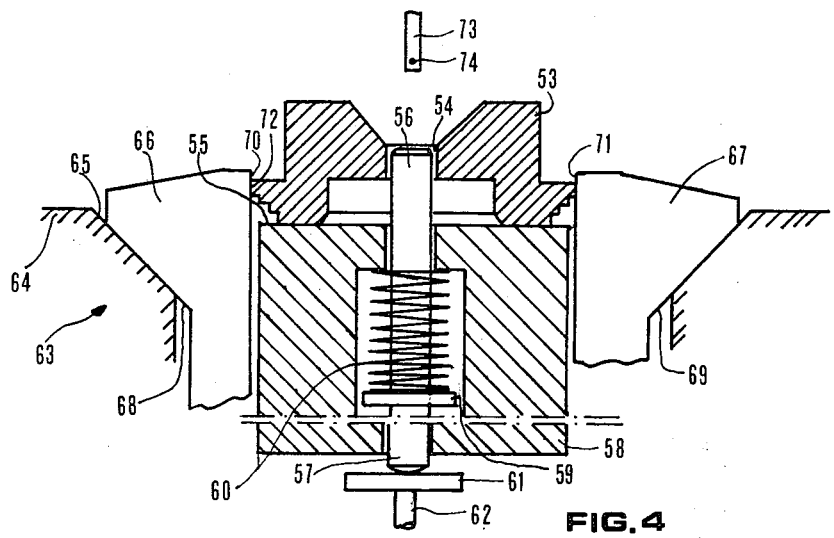
FIG. 4 is a diagrammatic vertical section of an apparatus according to a second embodiment of the invention, for a type of checking similar to that performed by the bench of FIGS. 1-3.

The bench of FIGS. 1-3 comprises a base 1 which supports the part 2 to be checked, consisting of the body of an injector. The part 2 has a bore 3 having a small diameter, whose value must be checked. The positioning of part 2 is carried out by a clamping device 4 of spring collet type, including a nose-piece 5 with fixed abutments 6 and a movable arm 7 with an abutment 8. Nose-piece 5 and arm 7 are housed within a hole 9 communicating with bore 3 and coaxial—with narrow tolerance—with the same.

Another nose-piece, or pin 10, supported by a spindle 11 axially displaceable within nose-piece 5, may enter into bore 3.

Two gauging heads, one of which, 12, is visible in FIG. 1, have relevant moving arms 13,14 with probes or feelers 15,16. The two heads are fixed, in vertically adjustable positions, to a horizontal support 17, which is fixed in a position horizontally adjustable to a horizontal leg 18 of a parallelogram type set including two vertical flat springs 19,20 and another horizontal leg 21. Horizontal leg 21 has a vertical arm 22 with a reference surface 23 which can cooperate with a side surface 24 of a slot 25 obtained in leg 18. A spring 26, having its ends fixed to arm 22 and to a pin 27 coupled to leg 18, urges surfaces 23 and 24 towards each other.

Leg 21 is mounted upon a precision pivot 28 supported by base 1. A rod 29, slidable within bushes 30,31 housed within a stanchion 32 of base 1, has a ledge 33 which may enter into contact with a roller 34 arranged at the end of an arm 35 fixed to leg 21. A spring 36, having its ends coupled to arm 35 and to a pin 37 fixed to stanchion 32, acts on arm 35 tending to make it, and thus leg 21 and the parallelogram type set, rotate counterclockwise about pivot 28. A ledge 38 fixed to base 1 limits the counterclockwise rotation of leg 21 when it is contacted by a reference surface 39 fixed to leg 21.

A vertical arm 40, fixed to leg 18 of the parallelogram type set, supports a reference element 41 which can cooperate with the end of the rod 42 of a hydraulic dashpot 43 including a cylinder 44 and a piston 45.

Cylinder 44 is coupled to stanchion 32. A spring 46 is arranged between the bottom wall of cylinder 44 and piston 45. The dashpot 43 is substantially of unidirectional type, due to the presence of a valve including an axial conduit 47 with a conical seat 48 which may be closed by a ball 49 urged by a spring 50.

A supply, processing and indicating unit 51 is connected with gauging heads 12.

The operation of the bench of FIGS. 1-3 is as follows.

Rod 29 is lowered, from the position shown in FIG. 1, by means of a control pedal, not shown; ledge 33 therefore reaches the position shown by dashed lines. Thus rod 29 controls, through arm 35 a clockwise rotational movement of the parallelogram type set about pivot 28 and gauging heads 12 with feelers 15,16 move away from the measurement position. The position taken by the parallelogram type set is partially shown by dashed lines relating to leg 21.

Rod 29 is also connected with spindle 11 of nose-piece 10 which, during this phase, is displaced upwardly. The connection between rod 29 and spindle 11 is symbolized by the dot-dash line 52 in FIG. 2. Due to the clockwise rotational movement of the parallelogram set, reference element 41 disengages from rod 42. Therefore spring 46 urges piston 45 towards the right of FIG. 1, to the position shown by dashed lines.

The part 2 to be checked is then loaded in the measurement position only if nose-piece 10 may enter into bore 3. Then rod 29 is displaced again upwardly. Consequently, nose-piece 10 is lowered and clears bore 3; clamping device 4 clamps part 2 and the parallelogram set rotates about pivot 28, due to the action of spring 36, until reference surface 39 contacts ledge 38. During this rotation feelers 15,16 enter into bore 3, with a position slightly offset so that the measurement axis passing through the feelers is arranged along a chordal direction of bore 3.

Then spring 26, overcoming the action of spring 46, controls a slow motion of the parallelogram set, dampened by dashpot 43 until surfaces 23,24 arrive again into contact with each other.

Therefore feelers 15,16, together with gauging head 12, move along a direction perpendicular to the measurement axis and the amount of this movement is such as to guarantee that the feelers (which remain into contact with the part due to the measurement displacements of arms 13, 14), at a certain moment during this movement, take a position according to a diametral direction.

Unit 51, which receives the output signals of gauging heads 12 during the scanning movement, includes peak detecting circuits which detect the maximum value of the sum of the two signals (or the sum of the relevant maximum values), this value being indicative of the bore 3 diameter.

Nose-piece 10 constitutes a safety element provided for checking whether bore 3 is in the proper position and has a diameter such as to permit, after the retraction of nose-piece 10, entering of feelers 15, 16.

With reference to FIG. 4, part 53 has a bore 54 whose diameter must be checked; the diameter has a small value, e.g. 1 mm approximately. Part 53 is placed on a reference plane 55 so that a nose-piece or pin 56 enters into bore 54. Nose-piece 56 is supported by a spindle 57 axially guided within a body 58 defining reference plane 55; spindle 57 has a ledge 59.

A spring 60 cooperates with ledge 59 tending to lower spindle 57 so as to clear bore 54 from nose-piece 56.

A control device includes a plate 61, which can cooperate with the lower end of spindle 57, and a rod 62 coupled to plate 61 and axially movable. This control device can displace nose-piece 56 upwardly and, by lowering plate 61, can permit spring 60 to extract nose-piece 56 from bore 54.

Part 53 is clamped on plane 55 by a spring collet device 63 mounted on a spindle which can control rotation of spring collet device 63 and of part 53 about a geometric axis. The spring collet device comprises an external body 64 defining a reference internal tapered surface 65 and four jaws, opposed two by two. The jaws, two of which, 66, are shown in FIG. 4, include curved external surfaces 68,69 adapted to remain into contact with surface 65, which acts as a reference, and to slide on it. The jaws also define flat internal surfaces 70,71 which enter into contact with a flange 72 of part 53, for clamping the latter.

Two adjacent jaws have internal surfaces 71 which are always at a distance from the spindle axis smaller than the distance of the other two jaws from the same spindle axis. Therefore spring collet device 63 can clamp part 53 offset with respect to the spindle axis, with an eccentricity having a preset value "e." The opening movement of the jaws is obtained by a vertical upward displacement of the jaws, which, are subjected to the action of suitable pneumatic or resilient devices in order that external surfaces 68,69 remain into contact with surface 65.

Body 58 is fixed to external body 64 and rotates with it and with the jaws when the spindle is activated.

The geometric axis of nose-piece 56 has the same eccentricity as part 53—when part 53 is clamped—with respect to the spindle axis, in order that the nose-piece may properly enter into bore 54 and perform the functions to be described hereinafter.

Two gauging heads, not shown, have relevant moving arms with feelers. One of the moving arms, 73, and the relevant feeler 74 are visible in FIG. 4. The gauging heads are coupled to a support, not shown, which is vertically movable for displacing the gauging heads in such a way as to maintain the measurement axis passing through the feelers in a plane wherein also lies the spindle axis.

Figure 5:
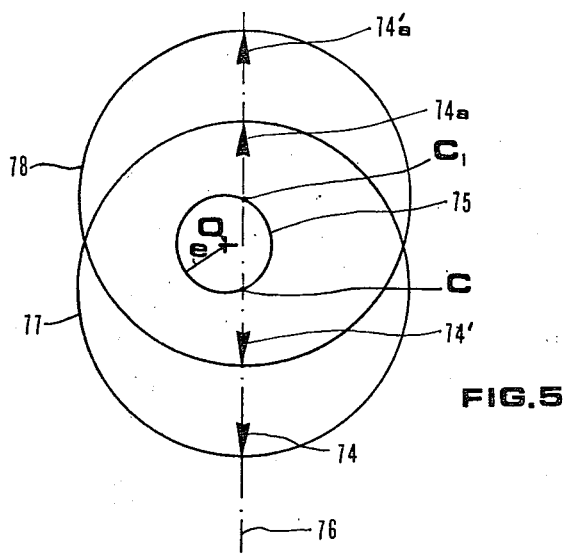
FIG. 5 is a geometric diagram for illustrating the operation of the apparatus of FIG. 4.

The operation of the apparatus is now described, with reference to FIG. 5, too.

Part 53 is loaded on plane 55 when spring collet device 63 is opened and nose-piece 56 is at the end of the downward stroke. Then clamping of part 53 is controlled; subsequently rod 62 displaces nose-piece 56 upwardly, through plate 61.

If the geometric characteristics of part 53, in particular those of flange 72 and bore 54, do not present excessive deviations from the basic or nominal form, nose-piece 56 enters into bore 54. On the contrary, non-entering of the nose-piece means that there are defects in part 53 or in the working of the apparatus and that it is necessary to stop the checking operation.

After a proper entering of nose-piece 56 into bore 54, removal of the nose-piece 56 and lowering of the gauging heads are controlled. Therefore the feelers enter into bore 54. Then the spindle controls a rotation, of at least 180°, of spring collet device 63, with part 53. Due to the eccentricity "e" in the clamping of part 53 with respect to the spindle axis (FIG. 5), the center of bore 54 in the cross-section plane passing through the feelers describes a circumference 75 having a radius "e" and whose center "O" is located on the spindle axis. In FIG. 5 the measurement axis 76 does not pass through point O, to take into account a possible error in the lying of the vertical plane passing through the measurement axis, with respect to the spindle axis.

During a 360° rotation of spring collet device 63 the condition that the measurement axis 76 overlaps diametral directions of part 54 occurs twice.

The corresponding position of the perimeter of the bore cross-section is shown by circumference 77,78 (the scale of FIG. 5 is enlarged with respect to that of FIG. 4), the centers of which are indicated by references C and C1. The corresponding positions of the feelers are indicated by references 74,74a,74',74'a.

In correspondence with these positions the sum signal of the gauging head signals takes its maximum value, which is detected by a supply, processing and indicating unit, not shown, connected to the gauging heads.

Figure 6:
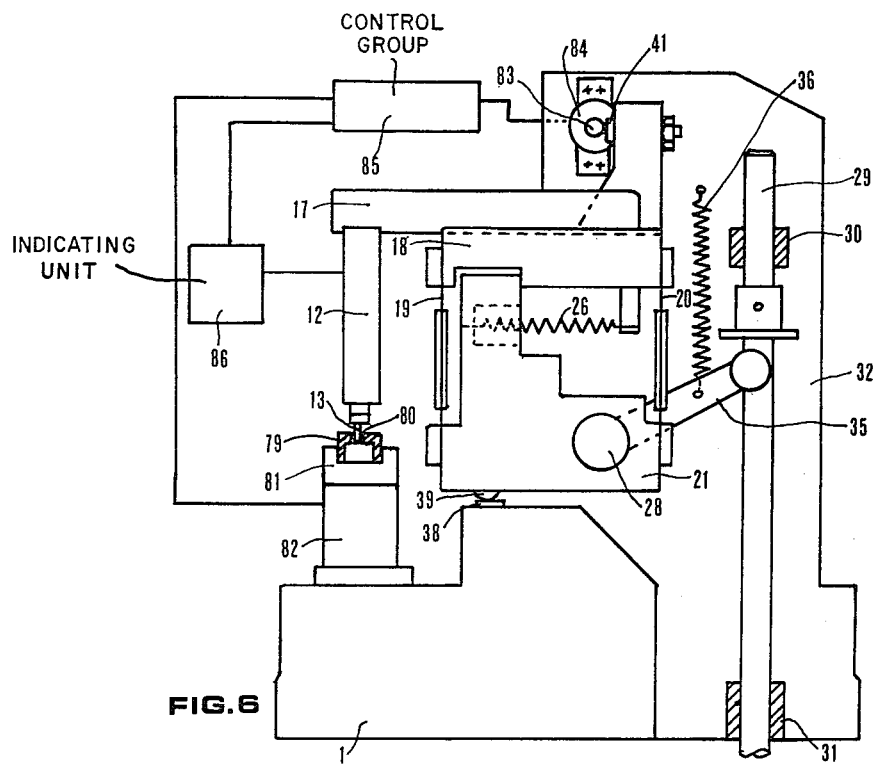
FIG. 6 is a diagrammatic side view, partly in section, of a bench for the dynamic checking of bore diameters, according to a third embodiment of the invention.

The bench of FIG. 6 comprises many elements similar to those shown in FIGS. 1-3 and therefore it is now described briefly, mainly with reference to modified elements and to its working.

Part 79, which has a bore 80 whose diameter must be dynamically checked, is clamped by a spring collet device 81 which can be rotated by a motor group with a spindle 82.

Spring collet device 81 may be similar to that shown in FIG. 4 and can be equipped with a safety nose-piece, similarly to the embodiment of FIG. 4, with the difference that spring collet device 81 clamps part 79 concentrically with spindle 82.

Reference element 41 contacts a cam 83 keyed onto the shaft of a motor 84 supported by stanchion 32. A logic and control group 85 is connected with motor 84, with spindle 82 motor group and with a supply, detecting processing and indicating unit 86 which is connected with gauging heads 12.

The working of the bench is as follows: after clamping of part 79 and checking, possibly by a nose-piece, of the correct positioning of bore 80, rod 29 is displaced upwards and ledge 38 comes into contact with reference surface 39; the feelers of gauging heads 12 enter into bore 80.

Then group 85 activates motor 84 and spindle 82 motor. Motor 84 makes cam 83 rotate with a speed considerably higher than that of spindle 82, for example according to a ratio of 10÷20:1. This means that while part 79 rotates relatively slowly about spindle 82 axis, the feelers, due to the presence of the parallelogram set, carry-out a reciprocating scanning movement along a direction perpendicular to the measurement axis. The detecting and processing circuits of unit 86 are syncronized depending on the rotation speed and/or the position of cam 83, in such a way that they detect, during every revolution of cam 83, the maximum value of the sum of the gauging heads signals. The maximum values obtained in this way, which correspond to the values of the bore diameter along different directions, can be visualized and further processed for obtaining, for example, the maximum and minimum diameters and the ovality of the bore cross-section contacted by the feelers.

Therefore the bench of FIG. 6 permits the dynamic check of the diameters of a bore, possibly very small, without chordal errors.

Figure 7:
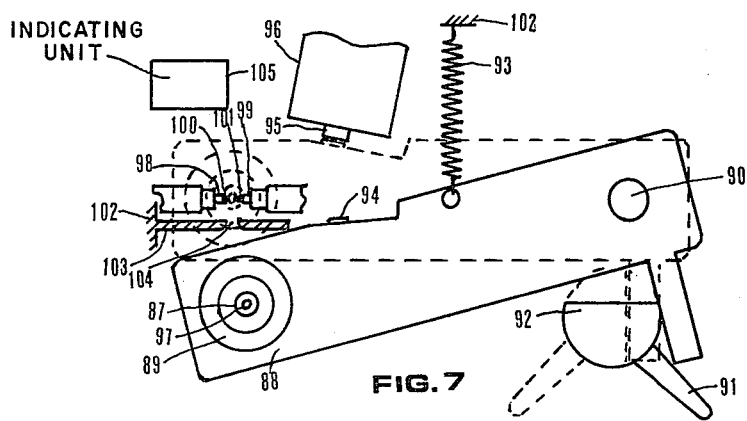
FIG. 7 is a diagrammatic plan view of a bench for checking an external diameter, according to a fourth embodiment.

The bench of FIG. 7 is fit for checking the external diameter of a part 87, even if this diameter is very small, without any need of using knife-shaped feelers.

Part 87 is clamped on an arm 88 by a spring collet device 89. Arm 88 can rotate about a pivot 90.

A control device including a lever 91 and a cam 92 controls clockwise and counterclockwise rotation of arm 88, between the end positions shown in the figure by continuous and dashed lines, respectively.

Arm 88, which is subjected to the action of a spring 93 tending to rotate it clockwise, has a ledge 94 which, at the end of the clockwise stroke, contacts the rod 95 of a hydraulic dashpot 96, the piston of which, not shown, is urged by a spring, not shown, for displaying rod 95 toward the exterior of dashpot 96. The action of spring 93 is stronger than that of the dashpot spring.

The checking of the outer diameter of pin 97 of part 87 is carried out by two gauging heads comprising relevant movable arms 98,99 with feelers 100,101. The gauging heads are adjustably supported by a base 102 of the bench.

The measurement axis passing through feelers 100,101 is arranged according to the radial direction of the arc described by the center of the cross-section of pin 97 as a consequence of the rotation of arm 88 about pivot 90.

A vertical plate 103, cross-sectioned in FIG. 7, is coupled to base 102 and has a shaped opening 104, with dimensions slightly larger than the relevant basic dimensions of the cross-sections of the part 87, for carrying out safety functions and avoiding that parts 87 having dimensions which might damage the gauging heads, or incorrectly clamped by device 89, come into contact with feelers 100,101.

In fact, these pieces are blocked by plate 103 which stops the rotation of arm 88.

If the dimensions and the clamping of part 87 are not anomalous, the part, due to the clockwise rotation of arm 88, reaches feelers 100,101, through a displacement damped by dashpot 96, and the feelers scan a portion of the corresponding cross-section of part 87, in such a way that at a certain instant the measurement axis overlaps a diametral dimension of the part. A supply, detecting and indicating unit 105 detects the maximum value of the sum of the gauging heads signals, providing an indication of pin 97 diameter.

Figure 8:
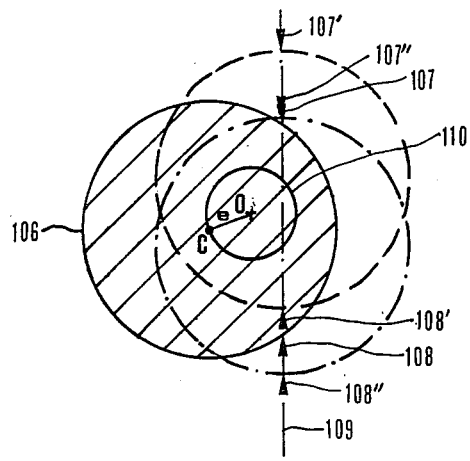
FIG. 8 is a diagram for explaining how the apparatus of FIG. 4 may be modified for checking an external diameter.

The apparatus of FIG. 4 can be used, by simple modifications, for checking an external diameter in such a way as to carry out the measurement principle illustrated in FIG. 8.

Part 106 is clamped on a spindle with an eccentricity "e" with respect to the spindle axis, indicated by reference "O." Two gauging heads have feelers 107,108 arranged along a measurement axis 109.

During the rotation of the spindle, the center "C" of the part 106 cross-section contacted by feelers 107, 108 describes a circumference 110. For every revolution of the spindle the measurement axis overlaps two times diametral directions of part 106; the corresponding positions of feelers 107,108 are marked by 107',108' and 107'',108''. In this way it is also possible to check the external diameter of a part without chordal errors and without any need of using knife-shaped feelers.

Figure 9:
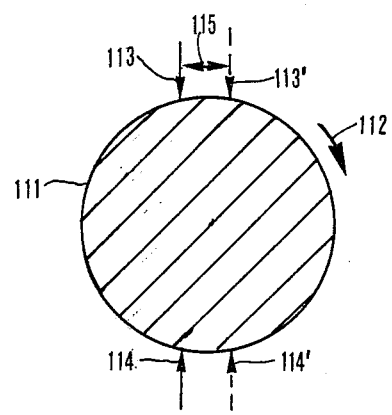
FIG. 9 is a diagram for explaining how the bench of FIG. 6 may be modified for carrying out the dynamic checking of an external diameter.

By simple modifications the bench shown in FIG. 6 may be used for carrying out a dynamic check of the external diameter of a part, according to the measurement principle illustrated in FIG. 9.

The part 111 is coaxially clamped on a spindle. The spindle is rotated and thus also the part 111 rotates, as indicated by arrow 112. Two gauging heads having feelers 113, 114 are fixed to a support which is displaced with an oscillating movement, with an oscillating period considerably higher than the revolution time of the spindle, so that feelers 113, 114 carry out a reciprocating scanning motion, indicated by arrow 115, between the end positions indicated by references 113,114;113',114'. During every oscillation cycle (or semicycle) a supply, detecting and processing unit, connected with the gauging heads, detects the maximum values of the sum of the gauging heads signals. The maximum values thus obtained, which correspond to the diameters of part 111 along different directions, can be visualized and further processed for obtaining, for example, the maximum and minimum diameters and the ovality of the part cross-section contacted by the feelers.

What is claimed is:

1. An apparatus for checking diametral dimensions of a cylindrical surface of a mechanical part, comprising: a base; measuring means including two probes adapted to cooperate, along a measurement axis, with two points of the cylindrical surface, the measuring means providing measurement signals; processing circuits connected with the measuring means; support and positioning means coupled to the base for supporting and positioning the part to be checked and the measuring means; and control means connected to the support and positioning means for displacing the probes in cooperation with the cylindrical surface and for obtaining a relative motion between the probes and the cylindrical surface, wherein the control means are adapted to control said relative motion as a scanning motion with a displacement of the relative position of the measurement axis, with respect to the base and the cylindrical surface geometric axis, having a component perpendicular to the measurement axis, for arranging the measurement axis and the geometric axis both in coplanar and in non-coplanar positions, the processing circuits being adapted to process the measurement signals obtained during the scanning motion for detecting the diametrical dimension of the cylindrical surface.

2. The apparatus as set forth in claim 1, for checking the diameter of a bore, wherein said support and positioning means and said control means are adapted to insert the probes into a bore with the measurement axis arranged along a chord of the bore and to subsequently control said relative motion along a direction substantially perpendicular to the measurement axis.

3. The apparatus as set forth in claim 2, wherein said support and positioning means comprise a member supported by the base and rotatable about an axis, a support member for supporting the measuring means and a parallelogram type set for coupling the support member and the rotatable member.

4. The apparatus as set forth in claim 3, wherein said control means comprise a device for controlling the rotation of the rotatable member and a damper for defining the amount and the speed of said displacement of the measurement.

5. The apparatus as set forth in one of claims 2 to 4, wherein said support and positioning means comprise a nose-piece displaceable by the control means for checking the proper positioning of the part and the possibility of carrying out the checking of the diametral dimensions.

6. The apparatus as set forth in claim 1, wherein said support and positioning means and said control means comprise a device for realizing said relative motion as an oscillating motion, the processing means being adapted to detect subsequent values of the measurement signals, during said oscillating motion, for the dynamic checking of the diameters of a cross-section of the cylindrical surface.

7. An apparatus for checking a diameter of a cylindrical surface of a mechanical part, comprising measuring means including two probes adapted to cooperate, along a measurement axis, with two points of the cylindrical surface, the measuring means providing measurement signals; processing circuits connected with the measuring means; support and positioning means for supporting and positioning the part to be checked and the measuring means, the support and positioning means including a movable arm for supporting the part; and control means connected to the support and positioning means for displacing the probes in cooperation with the cylindrical surface and for obtaining a relative motion between the probes and the cylindrical surface, wherein the control means are adapted to displace said arm with respect to the measuring means for permitting the probes to scan a portion of the contour of the cylindrical surface and to obtain said relative motion as a scanning motion with a relative displacement of the position of the measurement axis, with respect to the cylindrical surface geometric axis, having a component perpendicular to the measurement axis, for arranging the measurement axis and the geometric axis both in coplanar and in non-coplanar positions, the processing circuits being adapted to process the measurement signals obtained during the scanning motion for detecting the diameter of the cylindrical surface.

8. The apparatus as set forth in claim 7, wherein said diameter is an external diameter.

9. The apparatus as set forth in claim 7 or claim 8, further comprising a safety device coupled to the measuring means, the safety device defining a shaped opening for checking the possibility of correctly effecting the operation of checking the diameter, and a damping device for defining the scanning speed of the probes.

10. An apparatus for checking the diameter of a cylindrical surface of a mechanical part, the cylindrical surface defining a geometric axis, comprising:

spindle means rotatable about a rotation axis for at least 180°; the spindle means including an eccentric clamping device adapted to clamp the part with a pre-set eccentricity between said geometric axis and rotation axis; and measuring and processing means including two movable probes adapted to cooperate, along a substantially stationary measurement axis, with two points of the cylindrical surface, the measuring means providing a measurement signal responsive to the distance of said points, wherein said pre-set eccentricity has a value sufficient to permit the probes to reach, during rotation of the spindle means, a diametral position with respect to the cylindrical surface and wherein said measuring and processing means are adapted to detect the maximum value of said measurement signal during the rotation of the spindle means.

* * * * *

UNITED STATES PATENT AND TRADEMARK OFFICE
CERTIFICATE OF CORRECTION

PATENT NO. : 4,344,233
DATED : August 17, 1982
INVENTOR(S) : ALBERTAZZI

It is certified that error appears in the above—identified patent and that said Letters Patent is hereby corrected as shown below:

Column 2, line 3, before "bending" insert --rather high--.

Claim 4, line 5 --axis-- should be inserted after "measurement".

Signed and Sealed this

Second Day of November 1982

[SEAL]

Attest:

GERALD J. MOSSINGHOFF

Attesting Officer     Commissioner of Patents and Trademarks